US008543697B2

(12) United States Patent
Knowles et al.

(10) Patent No.: US 8,543,697 B2
(45) Date of Patent: Sep. 24, 2013

(54) SYSTEM AND METHOD FOR COMMUNICATING STATE MANAGEMENT BETWEEN A BROWSER USER-AGENT AND A SERVER

(75) Inventors: Michael Knowles, Waterloo (CA); David Tapuska, Waterloo (CA); Tatiana Kalougina, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 1889 days.

(21) Appl. No.: 11/490,503

(22) Filed: Jul. 21, 2006

(65) Prior Publication Data

US 2007/0198715 A1 Aug. 23, 2007

(30) Foreign Application Priority Data

Jul. 22, 2005 (CA) ...................................... 2513022

(51) Int. Cl.
*G06F 15/173* (2006.01)
(52) U.S. Cl.
USPC ........... 709/225; 709/227; 709/228; 709/229; 709/230
(58) Field of Classification Search
USPC ................................ 709/225, 230, 227–229
See application file for complete search history.

(56) References Cited

U.S. PATENT DOCUMENTS

| 5,825,890 | A | 10/1998 | Elgamal et al. |
| 5,864,837 | A * | 1/1999 | Maimone ........................... 707/1 |
| 6,041,357 | A | 3/2000 | Kunzelman et al. |
| 6,055,569 | A | 4/2000 | O'Brien et al. |
| 6,061,794 | A | 5/2000 | Angelo et al. |
| 6,115,754 | A | 9/2000 | Langren |
| 6,154,767 | A | 11/2000 | Altschuler et al. |
| 6,185,625 | B1 | 2/2001 | Tso et al. |
| 6,233,318 | B1 | 5/2001 | Picard et al. |
| 6,286,032 | B1 | 9/2001 | Oberlander et al. |
| 6,341,316 | B1 * | 1/2002 | Kloba et al. ................... 709/248 |
| 6,393,468 | B1 | 5/2002 | McGee |
| 6,415,276 | B1 | 7/2002 | Heger et al. |
| 6,615,267 | B1 | 9/2003 | Whalen et al. |
| 6,721,780 | B1 | 4/2004 | Kasriel et al. |
| 6,721,871 | B2 | 4/2004 | Piispanen et al. |
| 6,795,555 | B1 | 9/2004 | Parisien et al. |

(Continued)

FOREIGN PATENT DOCUMENTS

| CA | 2379082 A1 | 9/2003 |
| CA | 2432590 A1 | 7/2004 |

(Continued)

OTHER PUBLICATIONS

GloMop: Global Mobile Computing by Proxy, GloMop Group, Sep. 13, 1995, pp. 1-12.

(Continued)

*Primary Examiner* — Luat Phung
*Assistant Examiner* — Najeebuddin Ansari
(74) *Attorney, Agent, or Firm* — Perry + Currier

(57) ABSTRACT

A method for communicating state information between a server and a mobile device browser, comprising the steps of providing a control channel between the server and mobile device browser, transmitting at least one message from the mobile device browser to the server over the control channel indicative of browsing-related cache data, and regulating subsequent transmission of data from the server to the mobile device browser based on the at least one message.

12 Claims, 4 Drawing Sheets

(56) References Cited

U.S. PATENT DOCUMENTS

| | | | |
|---|---|---|---|
| 6,813,690 | B1 | 11/2004 | Lango et al. |
| 6,950,863 | B1 | 9/2005 | Pham et al. |
| 7,000,032 | B2 | 2/2006 | Kloba et al. |
| 7,003,284 | B2 | 2/2006 | Schwartz et al. |
| 7,092,370 | B2 | 8/2006 | Jiang et al. |
| 7,330,883 | B1 | 2/2008 | Jessup et al. |
| 7,383,389 | B1 * | 6/2008 | Bumbulis ............... 711/130 |
| 7,565,423 | B1 | 7/2009 | Fredricksen |
| 7,747,749 | B1 | 6/2010 | Erikson et al. |
| 2001/0027450 | A1 | 10/2001 | Shinoda et al. |
| 2002/0002627 | A1 | 1/2002 | Stead et al. |
| 2002/0004813 | A1 | 1/2002 | Agarawal et al. |
| 2002/0031135 | A1 | 3/2002 | Inoue |
| 2002/0042920 | A1 | 4/2002 | Thomas et al. |
| 2002/0052916 | A1 * | 5/2002 | Kloba et al. ............. 709/203 |
| 2002/0107935 | A1 | 8/2002 | Lowery et al. |
| 2002/0138551 | A1 | 9/2002 | Erickson |
| 2002/0160790 | A1 | 10/2002 | Schwartz et al. |
| 2002/0194382 | A1 | 12/2002 | Kausik et al. |
| 2003/0050062 | A1 | 3/2003 | Chen et al. |
| 2003/0074425 | A1 | 4/2003 | Kawakita |
| 2003/0079039 | A1 | 4/2003 | Forkner et al. |
| 2003/0088421 | A1 | 5/2003 | Maes et al. |
| 2003/0088580 | A1 | 5/2003 | Desai et al. |
| 2003/0110266 | A1 * | 6/2003 | Rollins et al. ............ 709/227 |
| 2003/0112772 | A1 | 6/2003 | Chatterjee et al. |
| 2003/0120647 | A1 | 6/2003 | Aiken et al. |
| 2003/0126232 | A1 | 7/2003 | Mogul et al. |
| 2003/0177194 | A1 | 9/2003 | Crocker et al. |
| 2003/0202649 | A1 | 10/2003 | Haug, Jr. et al. |
| 2004/0010543 | A1 | 1/2004 | Grobman |
| 2004/0073626 | A1 | 4/2004 | Major et al. |
| 2004/0088375 | A1 | 5/2004 | Sethi et al. |
| 2004/0117486 | A1 | 6/2004 | Bourne et al. |
| 2004/0162885 | A1 | 8/2004 | Garg et al. |
| 2004/0172535 | A1 | 9/2004 | Jakobsson et al. |
| 2004/0177124 | A1 | 9/2004 | Hansen |
| 2004/0203670 | A1 * | 10/2004 | King et al. ............... 455/414.3 |
| 2004/0210604 | A1 | 10/2004 | Li et al. |
| 2004/0215665 | A1 | 10/2004 | Edgar et al. |
| 2004/0220975 | A1 | 11/2004 | Carpentier et al. |
| 2004/0223508 | A1 | 11/2004 | Sawyer et al. |
| 2004/0248558 | A1 * | 12/2004 | Chandhok ............... 455/412.1 |
| 2004/0249824 | A1 | 12/2004 | Brockway et al. |
| 2005/0060370 | A1 | 3/2005 | Xue et al. |
| 2005/0060498 | A1 | 3/2005 | Curtis |
| 2005/0065950 | A1 | 3/2005 | Chaganti et al. |
| 2005/0076087 | A1 | 4/2005 | Budd et al. |
| 2005/0094782 | A1 | 5/2005 | Kim |
| 2005/0117558 | A1 | 6/2005 | Angermann et al. |
| 2005/0125533 | A1 | 6/2005 | Svanbro et al. |
| 2005/0138176 | A1 | 6/2005 | Singh et al. |
| 2005/0144394 | A1 | 6/2005 | Komarla et al. |
| 2005/0144439 | A1 | 6/2005 | Park et al. |
| 2006/0031635 | A1 | 2/2006 | Zohar et al. |
| 2006/0036754 | A1 * | 2/2006 | Itoh et al. ............... 709/230 |
| 2006/0056415 | A1 | 3/2006 | Lee et al. |
| 2006/0077897 | A1 | 4/2006 | Kotzin |
| 2006/0218402 | A1 | 9/2006 | Kerstens et al. |
| 2006/0251047 | A1 | 11/2006 | Shenfield et al. |
| 2006/0277271 | A1 | 12/2006 | Morse et al. |
| 2007/0150524 | A1 | 6/2007 | Eker et al. |
| 2007/0156852 | A1 | 7/2007 | Sundarrajan et al. |
| 2008/0134018 | A1 | 6/2008 | Kembel et al. |
| 2008/0222242 | A1 | 9/2008 | Weiss et al. |

FOREIGN PATENT DOCUMENTS

| | | |
|---|---|---|
| EP | 1154356 | 11/2001 |
| EP | 1202585 A | 5/2002 |
| EP | 1441470 A | 7/2004 |
| WO | 99/17227 A | 4/1999 |
| WO | WO 0068824 A1 | 11/2000 |
| WO | 0161438 A | 8/2001 |
| WO | WO 01/76279 A2 | 10/2001 |
| WO | 03088566 A | 10/2003 |

OTHER PUBLICATIONS

Iyenger et al., "High Performance Web Site Design Techniques", IEEE Internet Computing, vol. 4, Issue 2, pp. 17-26 (Mar./Apr. 2000) [see Web Server Accelerators].

May, Michael, Jun. 19, 2008: Supplementary European Search Report.

William H. Collins of Ericsson et al.: "Method of recognizing duplicates in received information" Research Disclosure, Mason Publications, Hampshire, GB, vol. 440, No. 45, Dec. 1, 2000, XP007127230 ISSN: 0374-4353.

Kahol et al.: "A strategy to Manage Cache Consistency in a Disconnected Distributed Environment" [Online] Jul. 2001, pp. 686-700 XP002501708 Retrieved from the Internet: URL:http://ieeexplore.ieee.org/stamp/stamp.jsp?arnumber=00940744>.

European Search Report of EP 06 76 1162 dated Oct. 31, 2008.

European Search Report of EP 06 76 1166 dated Aug. 21, 2008.

"Wireless markup language specification version 1.1", Internet Citation, [Online] XP002161009 Retrieved from the Internet: URL:http://www1.wapforum.org/tech/documents/SPEC-WML-19990616.pdf.

Jiun-Long Huang, et al: "A QoS-aware transcoding proxy using on-demand data broadcasting" INFOCOM 2004. Twenty-Third Annual Joint Conference of the IEEE Computer and Communications Societies, IEEE, Piscataway, NJ, USA, vol. 3, Mar. 7, 2004. XP010740561.

Supplementary European Search Report of Jan. 14, 2009.

"Optimizing Web Delivery Over Wireless Links: Design, Implementation, and Experiences". Rajiv Chakravorty, Andrew Clark and Ian Pratt. IEEE Journal on Selected Areas in Communications, vol. 23, No. 2, Feb. 2005. pp. 402-416.

"The Design and Implementation of the FreeBSD Operting System" Marshall Kirk McKusick; Geroge V. Neville-Neil. Published by: Addison-Welsey Professional. ISBN-13: 978-0-201-70245-3, Published: Aug. 2, 2004.

Jesse Anton et al: "Web Caching for Database Applications With Oracle Web Cache" ACM Proceedings of SIGMOD. International Conference on Management of Data, XX, XX, Jun. 4, 2002, pp. 594-599, XP001152240 ISBN: 978-1-58113-497-1.

European Patent Application No. 06761164.0 Supplementary Search Report dated Dec. 14, 2009.

Zhu et al.: "Using Markov Models for Web site Link Prediction" Proceedings of the Thirteenth ACM conference on Hypertext and Hypermedia, [online]Jun. 11-15, 2002; pp. 169-170, XP002559093.

Ibrahim T. I. et al: "Neural nets based predictive prefetching to tolerate WWW latency" Distributed Computing Systems, 2000. Proceedings. 20th International Conference on Taipei, Taiwan Apr. 10-13, 2000, Los Alamitos, CA, USA, IEEE Comput. Soc, US, pp. 636-643, XP010379077, ISBN: 978-0-7695-0601-2.

Loon T. S. et al.: "Alleviating the latency and bandwidth problems in WWW browsing" Proceedings of the USENIX Symposium on Internet Technologies and Systems, XX, XX, Dec. 8, 1997, pp. 219-230, XP002109263.

European Patent Application No. 06761161.6 Supplementary Search Report dated Dec. 22, 2009.

Related Canadian Patent Application No. 2615715 Office Action dated Jun. 11, 2012.

* cited by examiner

SYSTEM AND METHOD FOR COMMUNICATING STATE MANAGEMENT BETWEEN A BROWSER USER-AGENT AND A SERVER

FIELD

This specification relates generally to mobile data communication systems, and more particularly to a method for communicating state information between a server, such as a proxy server, and a mobile Internet browser.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones.

It is known in the art to provide Internet browser functionality in such mobile communication devices. In operation, a browser user-agent in the handheld mobile communication device issues commands to an enterprise or proxy server implementing a Mobile Data Service (MDS), which functions as an acceleration server for browsing the Internet and transmitting text and images to the mobile device for display. Such enterprise or proxy servers generally do not store the state of their clients (i.e. the browser user-agent), or if they do, the state that is stored is minimal and limited to HTTP state (i.e. cookies). Typically, such enterprise or proxy servers fetch and transmit data to the browser user-agent when the browser makes a data request. In order to improve the performance of the browser on the mobile device, some enterprise or proxy servers fetch all the data required in order to fulfill the data request from the browser, aggregate the fetched data, and transmit the data to the device browser. For instance, if a HyperText Markup Language (HTML) page is requested, the enterprise or proxy server fetches any additional files referenced within the HTML page (e.g. Images, inline CSS code, JavaScript, etc.). Since the proxy server fetches all the additional files within the HTML file, the device does not have to make additional data requests to retrieve these additional files. Although this methodology is faster than having the device make multiple requests, the proxy server nonetheless has to send all of the data again if the site is later revisited. This is because the proxy server has no knowledge of the device caches (e.g. caches that are saved in persistent memory, for different types of data such as a content cache to store raw data that is cached as a result of normal browser activity, a channel cache containing data that is sent to the device by a channel or cache push, and a cookie cache containing cookies that are assigned to the browser by visited Web pages). For example, if a user browses to CNN.com, closes the browser to perform some other function (e.g. place a telephone call or access e-mail messages, etc.) and then later accesses the CNN.com Web site (or follows a link from CNN.com to a news story), the banner "CNN.com" will be transmitted from the MDS to the device browser each time the site is accessed, thereby consuming significant bandwidth, introducing delay, etc.

It is known in the art to provide local file caching. One approach is set forth in *GloMop: Global Mobile Computing By Proxy*, published Sep. 13, 1995, by the GloMop Group, wherein PC Card hard drives are used as portable file caches for storing, as an example, all of the users' email and Web caches. The user synchronizes the file caches and the proxy server keeps track of the contents. Mobile applications (clients) are able to check the file caches before asking for information from the proxy server by having the server verify that the local version of a given file is current.

BRIEF DESCRIPTION OF THE DRAWINGS

A detailed description of the preferred embodiment is set forth in detail below, with reference to the following drawings, in which.

DETAILED DESCRIPTION

Figure 1:
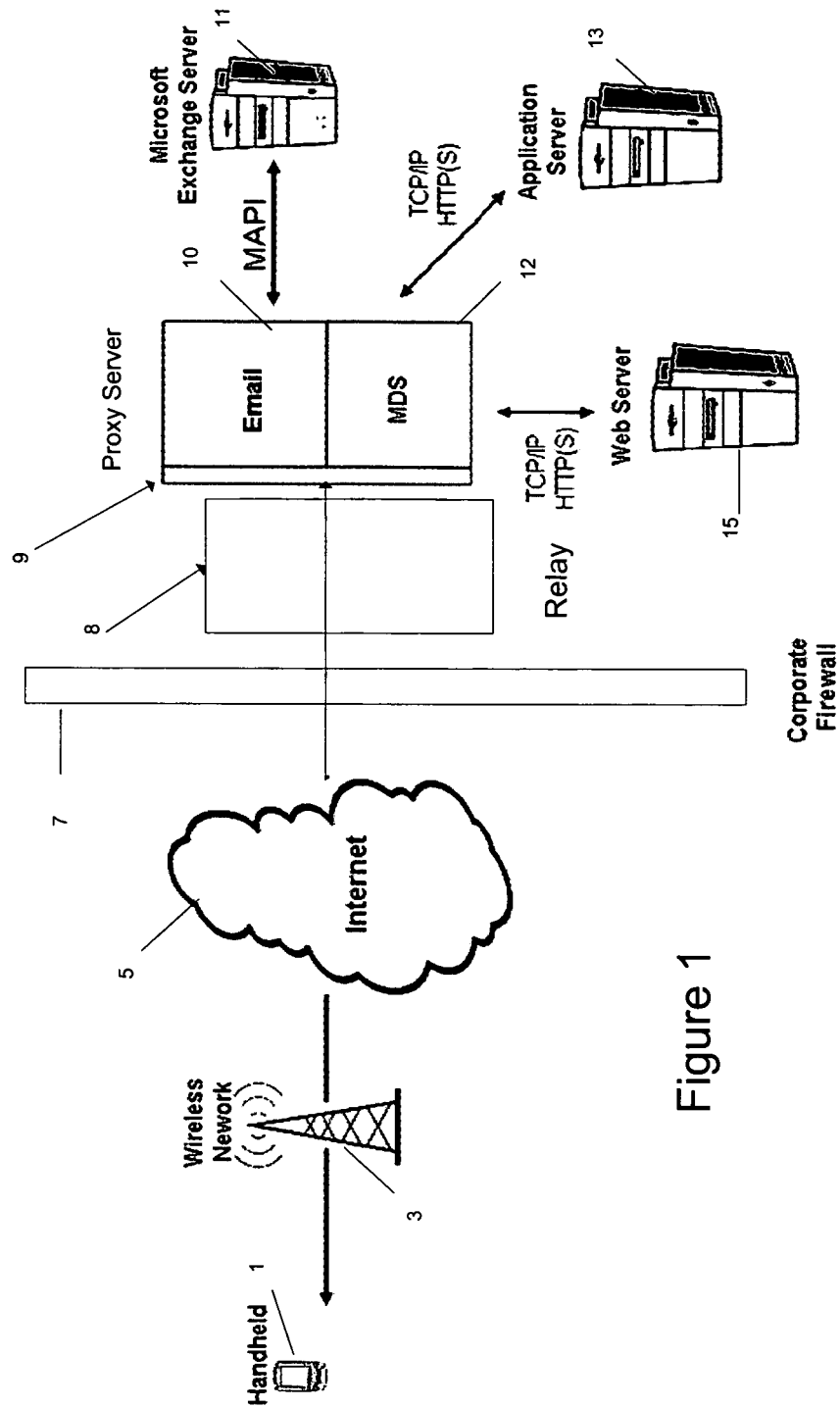
FIG. 1 is a block diagram of a communication system for implementing Internet browsing functionality in a mobile communication device.

In general, there is provided a method for communicating state information between a server and a mobile device browser, comprising providing a control channel between the server and mobile device browser, transmitting over the control channel at least one message from the mobile device browser to the server indicative of browsing-related state data, and regulating subsequent transmission of data from the server to the mobile device browser based on the at least one message.

According to an exemplary embodiment, an HTTP-like protocol is set forth, referred to herein as the Browser Session Management (BSM) protocol, for providing the aforementioned control channel between the proxy server and the mobile device browser, so that the mobile device browser can communicate to the proxy server what data the mobile device browser has cached (from previous browsing). The BSM protocol is an "out of band" protocol in that BSM communications are in addition to the usual stream of HTTP requests from the mobile device browser to the proxy server and provides "metadata" relating to cache contents. This metadata is used by the proxy server when handling subsequent requests from the mobile device browser, to determine what data to send to the mobile device browser, thereby significantly reducing data transfer on subsequent requests relative to the prior art methodology discussed above.

Because the proxy server is aware of what the mobile device browser has stored in its cache, the amount of data sent to the mobile device browser may be reduced, thereby increasing the performance of the mobile device browser and reducing operational cost. For example, if after the first request the CNN.com banner is cached and if the proxy server "knows" that the information has been cached then there will be no need to send the CNN.com banner to the mobile device browser upon subsequent visits to the CNN web site.

In contrast to the prior art GloMop caching methodology discussed above, the exemplary method set forth herein synchronizes the cache contents when the mobile device browser connects to the proxy server in order to initiate a session and keeps track of changes to the cache via knowledge of what data has been sent to the mobile device browser in combination with state information periodically received from the mobile device browser identifying what has actually been cached. Also, as set forth in greater detail below, the proxy server uses this cache knowledge to determine what to send back to the mobile device browser. In contrast, the prior art GloMop methodology does not contemplate sending any state information to the proxy server for identifying what has actually been cached in the device. Moreover, the prior art GloMop approach first checks the local cache, and then queries the proxy server to determine whether a particular data item in the cache is current or not. According to the GloMop prior art, the proxy server does not use its own knowledge of the mobile device browser cache to determine what to send back to the mobile device browser.

Additional aspects and advantages will be apparent to a person of ordinary skill in the art, residing in the details of construction and operation as more fully hereinafter described and claimed, reference being had to the accompanying drawings.

FIG. 1 depicts the architecture of a system for providing wireless e-mail and data communication between a mobile device 1 and an enterprise or proxy server 9. Communication with the device 1 is effected over a wireless network 3, which in turn is connected to the Internet 5 and proxy server 9 through corporate firewall 7 and relay 8. Alternatively, the device 1 can connect directly (via the Internet) through the corporate firewall 7 to the proxy server 9. When a new message is received in a user's mailbox within email server 11, enterprise or proxy server 9 is notified of the new message and email application 10 (e.g. Messaging Application Programming Interface (MAPI), MS Exchange, etc.) copies the message out to the device 1 using a push-based operation. Alternatively, an exemplary architecture for proxy server 9 may provide a browsing proxy but no email application 10. Indeed, the exemplary embodiment set forth herein relates to mobile browser device functionality and is not related to email functionality. Proxy server 9 also provides access to data on an application server 13 and the Web server 15 via a Mobile Data Service (MDS) 12. Additional details regarding e-mail messaging, MAPI sessions, attachment service, etc., are omitted from this description as they are not germane. Nonetheless, such details would be known to persons of ordinary skill in the art.

Figure 2A:
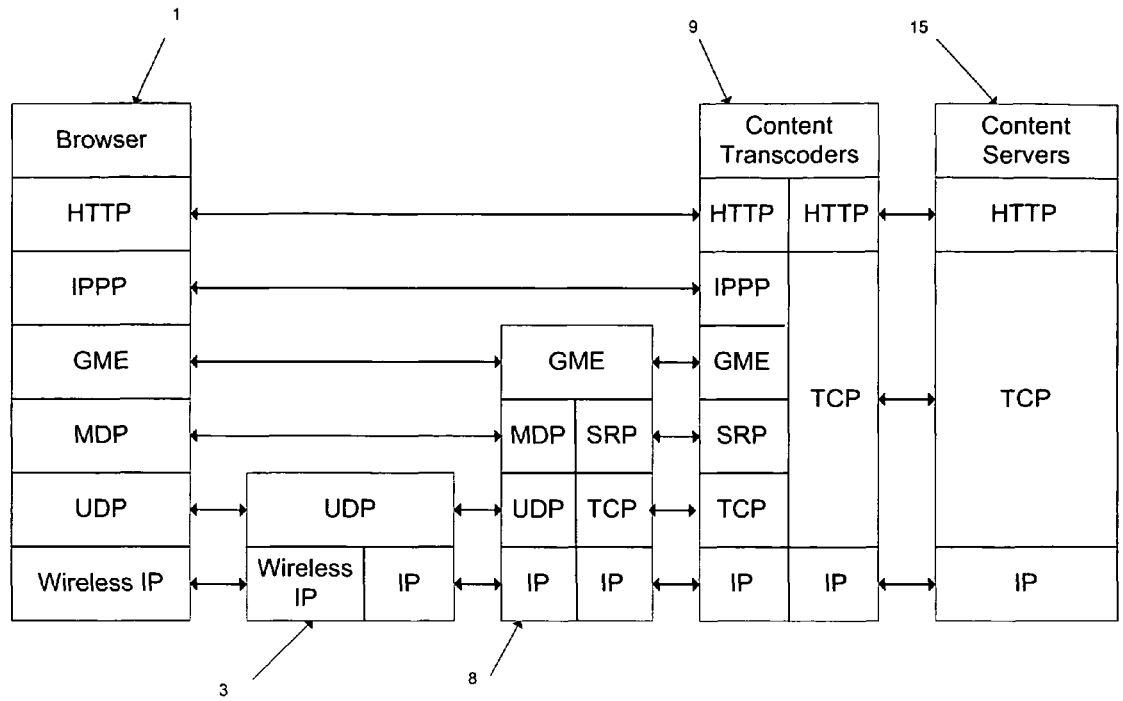
FIG. 2A shows communication protocol stacks for the communication system of FIG. 1.

In terms of Web browsing functionality, the device 1 communicates with enterprise or proxy server 9 using HTTP over an IP protocol optimized for mobile environments. In some embodiments, the device 1 communicates with the proxy server 9 using HTTP over TCP/IP, over a variant of TCP/IP optimized for mobile use (e.g. Wireless Profiled TCP), or over other, proprietary protocols. For example, according to the communications protocol of FIG. 2A, HTTP is run over Internet Point-to-Point Protocol (IPPP) and an encrypted Global Messaging Exchange (GME) channel over which datagrams are exchanged to transport data between the device 1 and proxy server 9. The GME datagrams are 64 Kbit in size whereas the wireless network 3 can only transport UDP datagrams with payloads up to 1500 bytes. Therefore, a Message Delivery Protocol (MDP) is used to separate the GME datagrams into one or more MDP packets, each of which is less than 1500 bytes (default size 1300 bytes), which are transported over UDP/IP to and from the relay 8 which, in turn communicates with the proxy server 9 via Server Relay Protocol (SRP)/TCP/IP. The MDP protocol includes acknowledgements, timeouts and re-sends to ensure that all packets of the GME datagram are received.

The communication between the device 1 and proxy server 9 is optionally encrypted with an encryption scheme, such as Triple Data Encryption Algorithm (TDEA, formerly referred to as Triple Data Encryption Standard (Triple DES)), as is known in the art. The proxy server 9 enables Internet access, preprocesses and compresses HTML and XML content from the Web server 15 before sending it to the device 1, transcodes content type, stores HTTP cookies on behalf of the device 1, and supports certificate authority authentications, etc.

In response to a request from the device browser, the proxy server 9 retrieves content from Web server 15 and creates a custom document containing both images to be displayed on the device and data in the form of compressed versions of requested portions of the document. The document is preferably of "multi-part" format to improve transmission to and processing efficiency within the device 1. Specifically, in order to display composite Web pages (i.e. pages composed of a main WML or HTML page and one or more related auxiliary files, such as style sheets, JavaScript files, or image files) the device browser is normally required to send multiple HTTP requests to the proxy server 9. However, according to the multi-part generation feature, the proxy server 9 posts all necessary parts of a composite Web page in a single bundle, enabling the browser to download all the required content with a single request. The header in the server response identifies the content as a multi-part bundle (e.g. Multi-Purpose Mail Extensions (MIME)/multipart, as defined by RFC 2112, E. Levinson, March 1997).

Figure 2B:
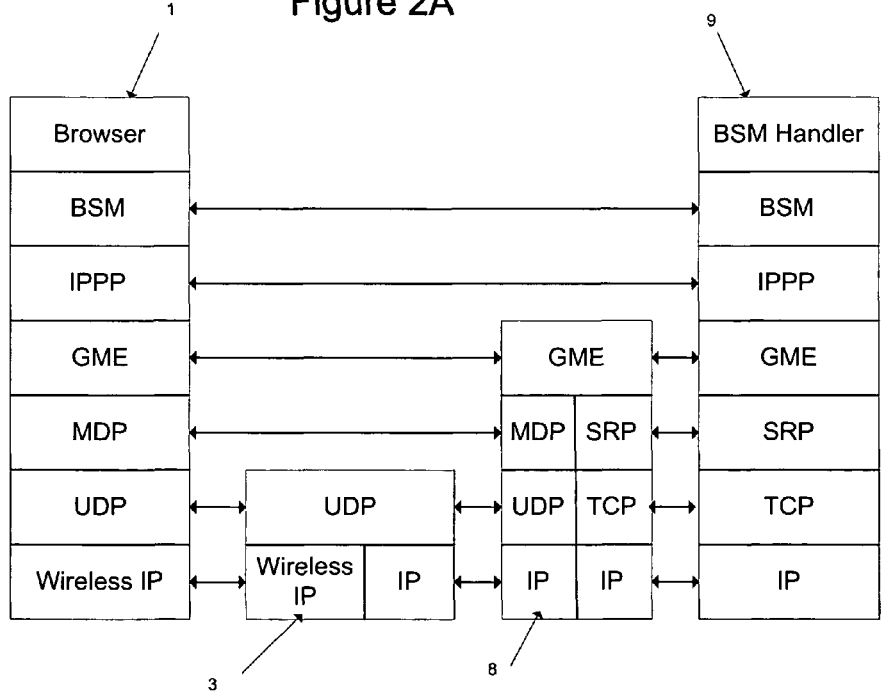
FIG. 2B shows communication protocol stacks for a Browser Session Management (BSM) protocol according to an exemplary embodiment.

In order to indicate device browser state information to the proxy server 9, three transitional state messages are defined herein, as follows: CONNECT, UPDATE and DISCONNECT, each of which conforms to the exemplary BSM protocol. As shown in FIG. 2B, the BSM communications protocol is identical to the protocol of FIG. 2A except that the conventional HTTP layer of the protocol stack is replaced by an HTTP-like BSM layer.

The CONNECT transitional message creates a new session with a connection identifier carried in the payload, device information and state data (e.g. current cache and device information) in the form of a set of hash functions for use by the proxy server 9 in preparing a response. Specific care is taken not to identify to the proxy server 9 what cookies or cache entries are contained on the device 1. Only hash values of the state data are sent to the proxy server 9 in order to protect the identity of state data on the device 1.

The CONNECT message also contains a unique authentication key for generating a MAC (Message Authentication Code) using a Hash Message Authentication Code (HMAC) algorithm that incorporates a cryptographic hash function in combination with the authentication key. Each portion of a multi-part document from the proxy server 9 also contains an HMAC, generated using the authentication key, that is used for authenticating the proxy server 9 before adding that portion to the device cache. This prevents a third party from creating its own multi-part document and sending it to the device 1 for injecting cache entries that could be used to extract personal information from the user.

Upon receipt of the CONNECT message, the proxy server 9 uses the state information to regulate or control the transmission of content retrieved from Web server 15 (step 23) to the device 1. One example of an application where this information can be used is when the proxy server 9 is pre-fetching images, inline Cascading Style Sheets (CSS), JavaScript, and the like for an HTML document. If the proxy server 9 already knows that the device 1 has the image, inline CSS, or JavaScript document, there is no need for resending the documents.

The UPDATE transition message notifies the proxy server 9 of changes that have occurred on the device 1 since the last CONNECT message or the last UPDATE message, between the device 1 and proxy server 9 (e.g. new cache entries added because of a push, or invoking the "Low Memory Manager" (LMM) or other memory-space preservation policies on the device and purging items from the cache).

The DISCONNECT transition message notifies the proxy server 9 that the device 1 will no longer send any more messages using the connection identifier specified in the payload. The proxy server 9 can then de-allocate any memory reserved for the connect session between the device 1 and proxy server 9. Upon receiving the disconnect message, the proxy server 9 deletes any session cookies for the device 1 (if it is processing cookies) along with state information. Receiving a request on the identified connection after the DISCONNECT has been received, and before any subsequent CONNECT message has been received, is defined as an error.

Since state is indicated from the device 1 to the proxy server 9, and state may be stored in transient memory within proxy server 9, a mechanism is provided for the proxy server 9 to return to the device 1 a message indicating that the session the device is trying to use is not valid. Once this occurs, the device 1 issues a new CONNECT message and establishes a new session with the proxy server 9, and re-issues the original request.

The data protocol set forth herein is similar to HTTP in order to reduce complexity and to reuse code that already exists for the HTTP protocol. Thus, data transmission according to this protocol begins with a STATE keyword; followed by a BSM (Browser Session Management) protocol identifier and a "Content-Length" header. The end of the "headers" is indicated by a double CRLF (a sequence of control characters consisting of a carriage return (CR) and a line feed (LF)), much like HTTP. After the double CRLF pair (i.e. \r\n) a WBXML (WAP Binary Extensible Markup Language) encoded document is inserted as the message payload. The WBXML document is later decoded using a DTD (Document Type Definition) and codebook, as discussed in greater detail below. The indication of the protocol version refers to what version of the DTD to validate the request against (ie. BSM/1.1 stipulates using version 1.1 of the DTD). It should be noted that WBXML encoding of the contents of BSM messages is set forth to allow for more efficient processing of the BSM message at the device 1, but that in alternate embodiments, the BSM message may be formatted as normal (textual) XML.

The following is an example communication using the protocol according to the preferred embodiment:

```
CONNECT BSM/1.0\r\n
Content-Length: 40\r\n
\r\n
<WBXML Encoded document of length 40 bytes>
BSM/1.0 200\r\n
r\n
```

In the foregoing, the first four lines form the CONNECT message from the device 1 to the proxy server 9, and the last two lines are the response from the proxy server 9.

An exemplary XML document, is as follows:

```
<?xml version="1.0"?>
<!DOCTYPE bsm PUBLIC "-// DTD BSM 1.0//EN"
    "http://www.something.com/go/mobile/BSM/bsm_1.0.xml">
<bsm id="2" hmac="12345678901234567890">
<cache>
<size>123012</size>
<entry urlHash="FEEDDEED01" dataHash="FDDEDEED11"
etag="SomeEtag"
expiry="256712323"/>
</cache>
<device>
<version>4.0.1.123</version>
<memfree>12342342</memfree>
</device>
</bsm>
```

Figure 3:
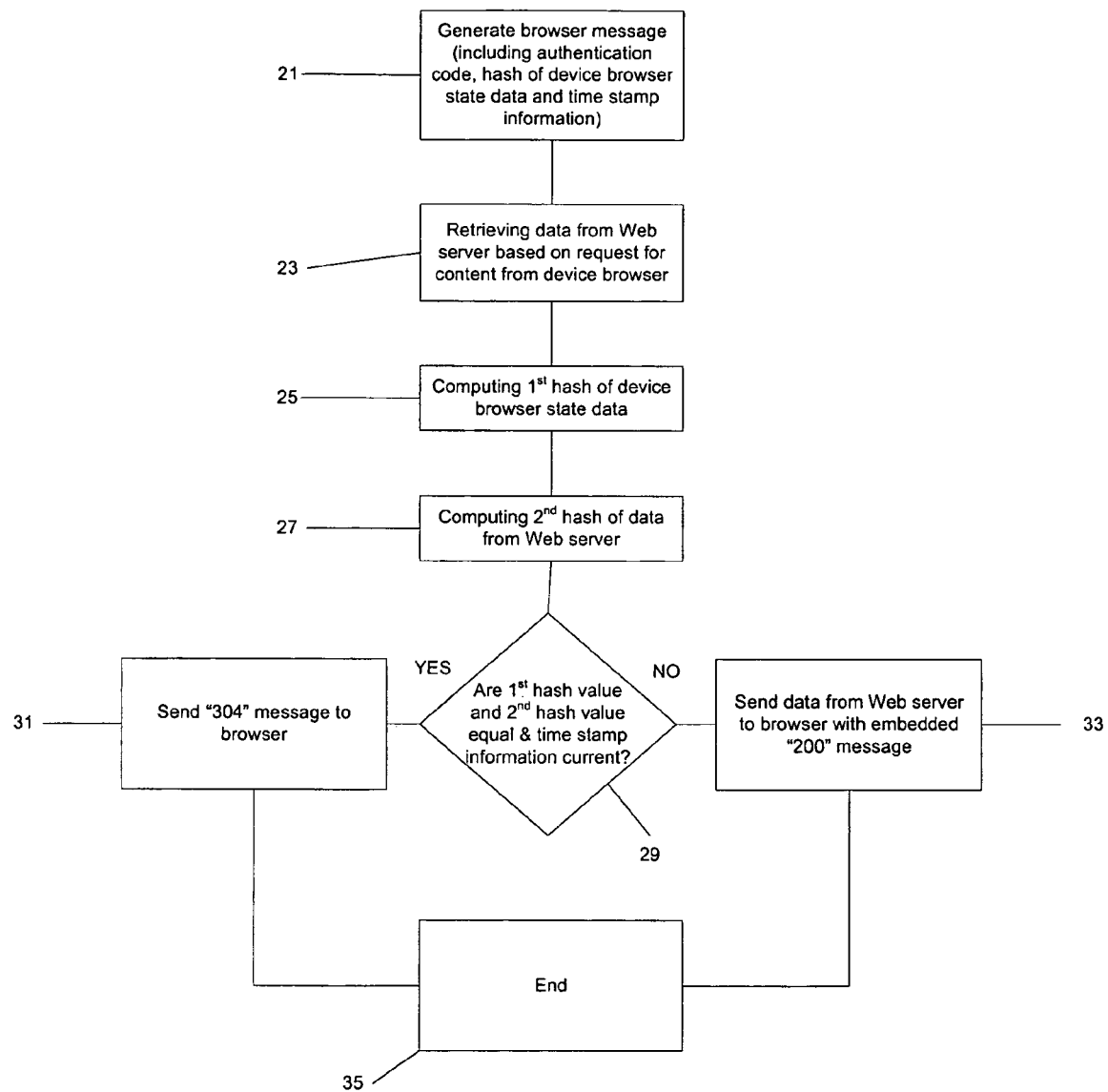
FIG. 3 is a flowchart showing the method for communicating information between a proxy server and a mobile Internet browser, according to the preferred embodiment.

In the example, the state data includes the URL of an HTML page within the device cache. It will be noted that the XML document payload includes a connection identifier (i.e. bsm id="2"), a value indicating when the document was last modified (i.e. etag="SomeEtag"), a page expiry (i.e. expiry="256712323"), and hash values for a URL (i.e. entry urlHash="FEEDDEED01") and a data attribute (i.e. entry dataHash="FDDEDEED11") rather than transmitting the actual URL and data attribute themselves. Thus, as shown in FIG. 3, the hashes of the URL and data attribute of the cached page are sent to the proxy server 9 in the CONNECT string (step 21). The proxy server 9 then fetches the requested page from Web server 13 (step 23), computes hashes of device browser state data (step 25) and data from the Web server 13 (step 27), and compares the hashes of the URL and data attribute of the requested page with the hashed URL and data attribute of the cached page, and also compares the time stamps/expiration information (step 29) in order to determine whether the cached page is current. Specifically, in response to the proxy server 9 retrieving a portion from the Web server 13, it computes the dataHash and urlHash of that portion and performs a comparison to the dataHashes and urlHashes of the entries it has saved. There are three cases.

In the first case, if both the dataHash and the urlHash of the retrieved portion match the dataHash and urlHash of a cache entry that the proxy server 9 knows the device 1 has, then the server 13 simply omits this portion from the response, as the device 1 still has a valid entry in its cache.

In the second case, if the dataHash of the retrieved portion matches the dataHash of a cache entry that the proxy server 9 knows the device 1 has, but the urlHash of the retrieved portion does not match the urlHash of that cache entry, the server 13 inlines this updated portion in the combined response to the device 1. However, because the dataHash matches a dataHash of an entry that already exists on the device 1, the inlined response does not include the actual data, but instead only includes a new HTTP header whose value is the new dataHash. When the device 1 receives this inlined portion, it detects the special header, looks for the cache entry with that dataHash, and either creates or updates its cache entry for that URL with the data corresponding to the dataHash by copying that data from the other cache entry (the cache for device 1 is modified to have two indexes, one to retrieve cache entries by URL, the other to retrieve cache entries by dataHash). Finally, if the proxy server 9 already has a cache entry for the urlHash, it updates that entry with the new dataHash; otherwise it creates a new entry for this portion.

In the third case, if the dataHash of the retrieved portion does not match the dataHash of any of the cache entries that the proxy server 9 has received from the device 1 in the BSM messages, then the server inlines the entire portion (headers and new data), since this portion has been updated and the device 1 does not contain the updated value anywhere in its cache.

Although not indicated in FIG. 3, it will be appreciated that each inline part to be added to a document to be displayed at the device 1 is fetched. If the response code from the proxy server indicates a "304" (step 31), then the part (i.e., the "304" response) is written as a block in the multipart document. On the other hand, if the proxy server 9 returns a "200" (step 33), then the hash compare operation is performed, and the portion is only included in the multipart document if the hash compare function indicates it is not already on the device 1.

An exemplary DTD, according to the preferred embodiment, is as follows:

```
<!ELEMENT  bsm (cache?, device)>
<!ATTLIST  bsm
              id          NMTOKEN   #REQUIRED
>
<!ELEMENT  cache (size, (entry)+)>
<!ATTLIST  cache
              action  (add|remove|remove_all|quick_add)  "add"
>
<!ELEMENT  entry EMPTY>
<!ATTLIST  entry
              urlHash       CDATA       #REQUIRED
              dataHash      CDATA       #REQUIRED
              etag          CDATA       #IMPLIED
              expiry        NMTOKEN     #IMPLIED
              size          NMTOKEN     #IMPLIED
              last-modified NMTOKEN     #IMPLIED
>
<!ELEMENT  size (#PCDATA)>
<!ELEMENT  device (version, memfree)>
<!ELEMENT  version (#PCDATA)>
<!ELEMENT  memfree (#PCDATA)>
<!ELEMENT  hmac (#PCDATA)>
Element/Code
HMAC 12
Attribute/Code
size 9 (instead of action)
lastModified 10
actionAdd 11
actionRemove 12
actionRemoveAll 13
actionQuickAdd 14
```

Finally, an exemplary codebook, is as follows:

| Element | Code |
|---|---|
| Session | 5 |
| Cache | 6 |
| Size | 7 |
| Entry | 8 |
| Device | 9 |
| Version | 10 |
| MemFree | 11 |
| HMAC | 12 |

| Attribute | Code |
|---|---|
| Id | 5 |
| UrlHash | 6 |
| dataHash | 7 |
| ETag | 8 |
| Expiry | 9 |
| Action | 10 |

As is well known in the art, the codebook is used as a transformation for compressing the XML document to WBXML, wherein each text token is represented by a single byte from the codebook.

As discussed above, the proxy server 9 transmits multi-part documents in a proprietary format of compressed HTML, interspersed with data for images and other auxiliary files (which may or may not be related to the main HTML Web page). However, in a departure from conventional HTML, each document part may also include a response code (e.g. "200" for OK, or "304" for "not modified" to indicate that the specified document part has already been cached in the device 1). This may be used for selective downloading of document parts rather than entire documents and for indicating when a part (e.g. image) is about to expire. This is useful, for example, when one Web page links to another page containing one or more common elements.

Of course, certain device requests (e.g. page refresh) will always result in a full document download, irrespective of device state information stored in the proxy server 9.

It is contemplated that the inclusion of response codes may be used by heuristic processes within the proxy server 9 to learn user behaviour and modify downloading of documents based on tracking the history of certain changes reflected in the hash value (e.g. the server 9 may learn to download a certain page (e.g. CNN news) at a particular time each day based the user's history of issuing requests for that page at regular times. As discussed above, because the downloaded documents are multi-part and contain embedded response codes, only those portions of the document that have changed are actually downloaded.

Figure 4:
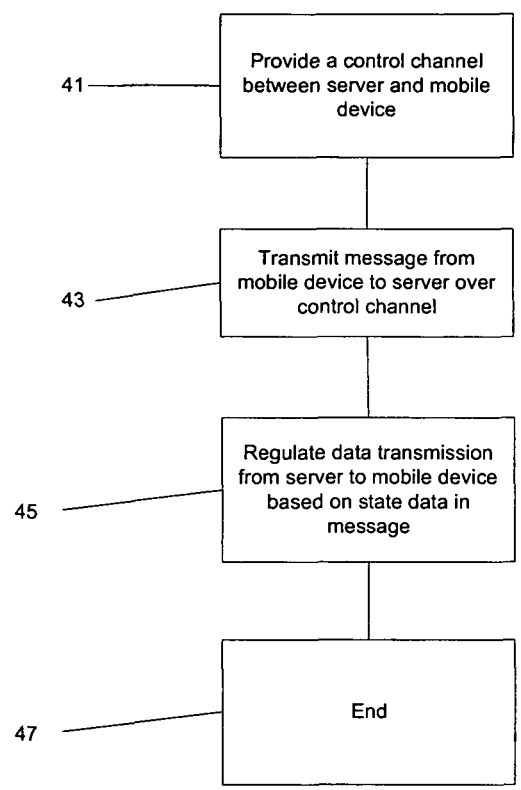
FIG. 4 is a flowchart of an exemplary method according to the present specification.

FIG. 4 illustrates a broad aspect of the exemplary method, wherein a control channel is established between the mobile device 1 and proxy server 9 (step 41). The mobile device 1 then sends a message, over the control channel, that contains browser-related state data (step 43). The proxy server 9 thereafter regulates transmission of data to the mobile device 1 based on the state data received from the mobile device browser 1 (step 45). The method then ends (step 47).

As indicated above, the protocol of the preferred embodiment is preferably carried over a proprietary IPPP transport layer, but can also be easily adapted to run over TCP/IP on a specific port. The protocol is preferably implemented as a handler in the proxy server 9, thereby simplifying any currently existing protocol. (e.g. to avoid overloading a current HTTP protocol).

A person skilled in the art, having read this description of the preferred embodiment, may conceive of variations and alternative embodiments. For example, the conditional transfer of data based on communication of state information, as set forth above, may also be applied to separately transmitting individual portions of the multipart document as opposed to transmitting the entire document at once.

In some embodiments, the proxy server 9 uses heuristic algorithms to learn what additional data requests the device may make based on knowledge of the current request, and knowledge of past activity. In some instances, the device may follow a pattern of requesting a first Web page, and then a second Web page. For example, the device may first request the "cnn.com" Web page, and then request the "cnn.com/ news" Web page. The proxy server 9 learns this pattern, and whenever the device requests the first Web page, the proxy server 9 determines that the device is likely to then request the second Web page. The proxy server 9 then fetches the second Web page, and uses its knowledge of the data cached on the device 1 (i.e. from the state information transferred to the proxy server 9 during initiation of the present connection) to determine whether the second Web page already exists within the data cached on the device. If so, the proxy server 9 includes information about the second Web page via response codes embedded within the response provided for the first Web page. If the device 1 requires the second Web page, then the device 1 can reference its cache and can avoid having to make a request to the proxy server 9 for the second Web page.

In other embodiments, heuristic processes within the proxy server 9 learn user behaviour and modify downloading of documents based on tracking the history of certain changes reflected in the hash value (e.g. the proxy server 9 may learn to download a certain page (e.g. CNN news) at a particular time each day based the user's history of issuing requests for that page at regular times). As discussed, because the downloaded documents are multi-part and contain embedded response codes, only those portions of the document that have changed are actually downloaded.

All such variations and alternative embodiments are believed to be within the ambit of the claims appended hereto.

What is claimed is:

1. A method for regulating transmission of data from a server to a mobile device browser, comprising:
   providing a control channel between the server and the mobile device browser;
   transmitting over said control channel at least one message from the mobile device browser to the server indicative of browsing-related state data, said browsing-related state data including a URL for a requested web page and a data attribute indicative of cache contents for portions of said web page, said at least one message conforming to an out-of-band protocol for indicating said browsing-related state data to the server as a hash value; and
   regulating subsequent transmission of data from the server to the mobile device browser based on said at least one message,
   wherein said protocol includes:
      a first transitional state message with payload including said hash value and a connection identifier, for notifying the server of current state information for a current session between the mobile device browser and the server; and
      a second transitional state message for notifying the server that the mobile device browser has ceased sending messages using said connection identifier, and
      data transmission according to said protocol comprises, in sequence:
         a header representing one or more of said first transitional state message and said second transitional state message;
         a protocol identifier and a Content-Length header;
         a sequence of control characters; and
         an XML-encoded document containing said hash value, a connection identifier and state information.

2. The method of claim 1, wherein said protocol further includes a third transitional state message for notifying the server of changes in state subsequent to said current session between the mobile device browser and the server.

3. The method of claim 1, wherein the server de-allocates stored memory for the session in response to being notified that the mobile device browser has ceased sending messages using said connection identifier.

4. The method of claim 1, wherein each said subsequent transmission of data from the server contains a message authentication code (MAC) for authentication by a mobile device associated with the mobile device browser prior to caching said data within the mobile device.

5. A method for synchronizing cache contents of a mobile browser with a proxy server, comprising:
   initiating a session between the mobile browser and the proxy server conforming to an out-of-band protocol for transmitting browser state information regarding said cache contents to the proxy server as a hash value, said browser state information including a URL for a requested web page and a data attribute indicative of cache contents for portions of said web page;
   maintaining a record of data sent from the proxy server to the mobile browser for storage in said cache;
   maintaining a record of said state information regarding said cache contents transmitted from the mobile browser to said proxy server; and
   transmitting data requests from the mobile browser to the proxy server, in response to which the proxy server accesses each said record of data and returns only data that do not already form part of said cache contents,
   wherein said protocol includes:
      a first transitional state message with payload including said hash value and a connection identifier, for notifying the server of current state information for a current session between the mobile device browser and the server; and
      a second transitional state message for notifying the server that the mobile device browser has ceased sending messages using said connection identifier, and
      data transmission according to said protocol comprises, in sequence:
         a header representing said transitional state message;
         a protocol identifier and a Content-Length header;
         a sequence of control characters; and
         an XML-encoded document containing said hash value, a connection identifier and state information.

6. The method of claim 5, wherein said protocol includes a third transitional state message for notifying the proxy server of changes in state subsequent to said current session between the mobile browser and the proxy server.

7. The method of claim 5, wherein the proxy server de-allocates stored memory for the session in response to being notified that the mobile browser has ceased sending messages using said connection identifier.

8. The method of claim 5, wherein each said subsequent transmission of data from the proxy server contains an encryption key for authentication by the mobile browser prior to caching data.

9. A method of controlling delivery of content from an origin server to a mobile device browser associated with a mobile device via a proxy server, comprising:
   transmitting state information from the mobile device browser to the proxy server indicative of cached content and associated expiry headers, said state information including a URL for requested content and a data attribute indicative of cache contents for portions of said requested content, said state information conforming to an out-of-band protocol for indicating said cache contents to the proxy server as a hash value;

retrieving data from said origin server to the proxy server responsive to a request from the mobile device browser; and forwarding said data from the proxy server to the mobile device browser only in the event that said state information indicates that the mobile device has not already cached said data and otherwise indicating to the mobile device browser that said data is already cached and transmitting new expiry headers to the mobile device browser whereupon the browser performs a cache update with said new expiry headers, wherein said protocol includes:
a first transitional state message with payload including said hash value and a connection identifier, for notifying the proxy server of current state information for a current session between the mobile device browser and the proxy server; and a second transitional state message for notifying the proxy server that the mobile device browser has ceased sending messages using said connection identifier, and data transmission according to said protocol comprises, in sequence:
a header representing one or more of said first transitional state message and said second transitional state message;
a protocol identifier and a Content-Length header;
a sequence of control characters; and
an XML-encoded document containing said hash value, a connection identifier and state information.

10. The method of claim 9, wherein forwarding of said data from said proxy server to the mobile device browser further includes computing said hash value of said state information, computing a hash value of said data, comparing said hash values, forwarding said data from the proxy server to the mobile device browser in the event that said hash values are different, and sending a response to the mobile device browser containing a reference to data already cached in the mobile device browser.

11. A communication system, comprising:
a mobile device browser for transmitting over a control channel at least one message including a hash value indicative of browsing-related state data including a URL for a requested web page and a data attribute indicative of cache contents for portions of said web page, wherein said at least one message conforms to an out-of-band protocol; and
a server for receiving said at least one message and in response regulating transmission of data to the mobile device browser based on said hash value,
wherein said protocol includes:
a first transitional state message with payload including said hash value and a connection identifier, for notifying the server of current state information for a current session between the mobile device browser and the server; and
a second transitional state message for notifying the server that the mobile device browser has ceased sending messages using said connection identifier, and
data transmission according to said protocol comprises, in sequence:
a header representing one or more of said first transitional state message and said second transitional state message;
a protocol identifier and a Content-Length header;
a sequence of control characters; and
an XML-encoded document containing said hash value, a connection identifier and state information.

12. A communication system, comprising:
an origin server storing data;
a mobile device browser for transmitting state information including a URL for a requested web page and a data attribute indicative of cached content and associated expiry headers, said state information conforming to an out-of-band protocol for indicating said cache content as a hash value; and
a proxy server for receiving said state information, retrieving said data from said origin server to said proxy server, and forwarding said data to said mobile device browser only in the event that said state information indicates that a mobile device associated with said mobile device browser has not already cached said data and otherwise indicating to said mobile device browser that said data is already cached and transmitting new expiry headers to said mobile device browser whereupon the browser performs a cache update with said new expiry headers
wherein said protocol includes:
a first transitional state message with payload including said hash value and a connection identifier, for notifying the proxy server of current state information for a current session between the mobile device browser and the proxy server; and
a second transitional state message for notifying the proxy server that the mobile device browser has ceased sending messages using said connection identifier, and
data transmission according to said protocol comprises, in sequence:
a header representing one or more of said first transitional state message and said second transitional state message;
a protocol identifier and a Content-Length header;
a sequence of control characters; and
an XML-encoded document containing said hash value, a connection identifier and state information.

* * * * *